Dec. 9, 1958   R. J. GRUBB ET AL   2,863,649
EQUIPMENT FOR THE ACCURATE METERING, PROPORTIONAL
BLENDING, THOROUGH MIXING AND DISPENSING
OF MULTI-COMPONENT RESIN MIXTURES
Filed June 30, 1955
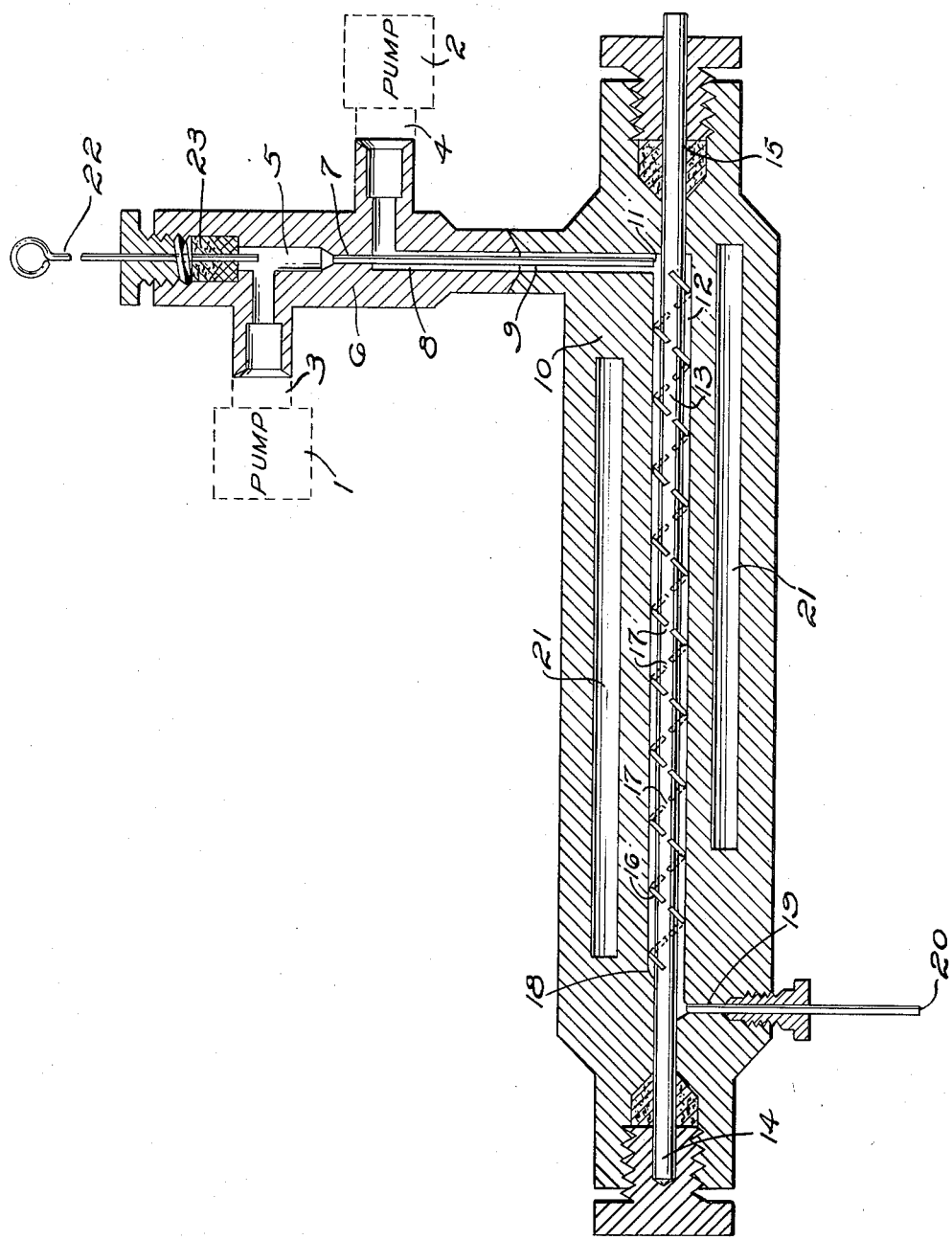
INVENTOR.
ROBERT J. GRUBB
LEMUEL E. SENTZ Jr
BY
AGENT.

United States Patent Office 2,863,649
Patented Dec. 9, 1958

2,863,649

EQUIPMENT FOR THE ACCURATE METERING, PROPORTIONAL BLENDING, THOROUGH MIXING AND DISPENSING OF MULTI-COMPONENT RESIN MIXTURES

Robert James Grubb and Lemuel Ellsworth Sentz, Jr., New Castle, Pa., assignors to American Cyanamid Company, New York, N. Y., a corporation of Maine Application June 30, 1955, Serial No. 519,087

1 Claim. (Cl. 259—9)

This mixture relates to an apparatus for the accurate metering and mixing of compositions of matter, and more specifically, it relates to an apparatus for the accurate metering and mixing on a small scale of compositions of matter having a short period of coexistence when mixed, before setting or polymerizing.

Many devices have been constructed which permit the accurate metering of fluids of low viscosity followed by effective mixing of several components. Some of these apparatus are quite effective even for high viscosity materials, provided the compositions have long life, or for short life materials whose viscosity is not too high. There is, however, a field of compositions whose handling is a very difficult problem. This is the handling of compositions whose viscosity is high and whose pot life is very short. The problem of accurately metering in very small quantities and mixing materials which, once having been mixed, will set in a very short time, and the mixing and delivery of this material to the place where it is allowed to set, all done by automatic operation, is one for which no apparatus heretofore known has been the solution. Problems of this sort arise principally in the resin field where mixtures are made of ingredients, which by themselves, are quite stable, but when mixed become quite unstable and set in a short period of time. When such compositions also are very viscous and the amount to be delivered is very small, the combination of disadvantageous characteristics makes automatic handling a difficult problem.

One example of a composition which presents this peculiar combination of problems is a composition to be cast in the form of a plug for sealing the lead wires in an electric blasting cap. In this field it is desired to cast, in place, in the cap around the wires, a plug which will hermetically seal the lead wires into the blasting cap. One mixture suitable for such a use has a final composition of a definite proportion of an epoxy resin mixed with a polymeric polysulfide elastomer. By themselves, these two ingredients are quite stable, although both are thick viscous liquids in the unpolymerized form. In preparation for mixing to form the composition, the epoxy resin is milled with lead dioxide, the catalyst for the polymerization of the polysulfide resin. The polysulfide polymer is compounded with carbon black in the normal manner for the compounding of rubber-like materials. The problem now is to mix these two viscous materials in a very definite proportion and deliver to the blasting cap in a quantity of the order of one-half to two cc. in a time limit which is quite restricted, due to the short setting time of the mixture when heated to temperatures high enough to permit the composition to flow.

We have constructed an apparatus which is capable of handling materials such as previously described in a satisfactory manner, of metering the ingredients accurately, mixing them, and delivering the mixture in accurate amounts to the place where the composition is to set, within the time limit of the pot life of the composition. The apparatus of our invention comprises small heated reciprocating pumps of accurate dimension whose stroke is accurately synchronized by a cam means, a concentric delivering system which inserts the separate ingredients into the mixing chamber exactly at the point of mixing, a counter current-rotating worm-type mixing means, filling most of the mixing chamber and a delivery tube of small diameter forming an exit from the opposite end of said mixing chamber.

It is an advantage of our invention that this new apparatus makes possible, on a production scale, the use of carefully measured quantities of highly viscous and very short pot life resin mixtures, thus increasing the speed of processing application and curing of the articles to be manufactured from such mixtures. Such an increase in speed of processing, etc. decreases the necessary floor space, investment in equipment, and handling requirements needed to produce these materials. It is a further advantage of our invention that it permits the useful handling on a production basis of highly viscous resins which hitherto have been regarded as unusable on a practical basis. It thus permits the production of finished products with improved physical properties, hitherto not obtainable. It is a further advantage that the accurate metering and the small delivery permits the continuous manufacture of small resin articles which hitherto had to be prepared by manual operation with a resultant waste of labor and in material. It is a further advantage of our invention that it can be employed to meter and mix viscous, short pot life compositions, either in a continuously repeating cyclic operation or in an operation requiring a continuous stream.

Our invention will be better understood with reference to the drawing.

The figures is a side sectional view of the mixing apparatus of our invention.

With more specific reference to the drawing, the pumps 1 and 2 (shown schematically), are small, heated, reciprocating pumps of highly accurate dimensions and stroke. By a cam means, not shown, the stroke of the several pumps is controlled so that each pump starts and stops its stroke at the same time and delivers material at a constant rate throughout its stroke. The volume of each material delivered on any one stroke is controlled by the length of the stroke and the diameter of the cylinder. Each pump is connected to the apparatus by a suitable heated delivery means 3 and 4. The delivery means 3 leads from pump 1 to the chamber 5 within the proportioning device 6. Chamber 5 opens into a thin walled, small diameter tube 7 which extends the length of the proportioning device. The delivery tube 4 leads from pump 2 into the proportioning device 6 where it opens into the annulus 8 between the thin walled tube 7 and the walls of the proportioning device 6. This connects with a similar annulus 9 between the tube 7 and the bore in the mixing device 10. At 11, at the terminus of the tube 7, the two streams are simultaneously introduced in a concentric stream of one in the other into the mixing chamber 12 at one end of that mixing chamber, which extends the length of the mixing device 10. Extending the length of the mixing chamber 12 is a mixing rod 13 which is journaled at 14 to one end of the mixing device 10 and at 15 passes through a packing gland to a rotating driving means, not shown. A small wire 16 is spirally wound around the mixer 13, fixedly attached thereto in such a way that there is but small clearance between the spiral and the walls of the mixing chamber 12. At regularly spaced intervals in the spiral, notches 17 are cut. At the exit end 18 of the mixing chamber 12 the bore of the chamber decreases to a small channel leading to the exit tube 19. The exit tube 19 leads to the outside of the mixing device 10 to the delivery point 20 where the mixed composition is delivered to be cast. Jackets 21, for heating or cooling, are provided within the mixer 10 in order to control the temperature of the compositions being mixed. At the top of the proportioning device 6, a rod 22 passes through a packing gland 23 into the chamber 5. It is positioned and dimensioned such that when lowered, it will exactly fill the tube 7. When the machine is in operation the rod 22 is withdrawn so that its end just protrudes to chamber 5. Its use in the operation of the machine will be described later.

The machine, thus described, was specifically designed to handle two solid in liquid dispersions of very high viscosity. The operation of such a machine can be best described with reference to the use of casting dynamite blasting caps plugs which is one of the purposes for which it was designed. The pumps 1 and 2 can be any small accurately dimensioned positive displacement reciprocating pumps. In practice, we have used Milton Roy Twin "minipumps," motor driven, and geared to 20 cycles per minute. Cycling of the pumps and synchronism is accomplished by two motor driven, simultaneously rotating, eccentric cams of suitable design. The pump 2 has a rated delivery of 40 cc. per minute and a discharge pressure of 1,000 p. s. i., a plunger diameter of ¼ inch, a plunger stroke of 1 inch. The pump 1 has a rated delivery of 100 cc./min. at 1,000 p. s. i., a plunger diameter of ⅛ inch, and a plunger stroke of 1 inch. In order to obtain the properly metered streams of the two components (that is 1 part of the material coming through pump 1 and 9 parts of the material coming through pump 2), the stroke of pump 2 is restricted to 50% of its normal stroke, and that of pump 1, 25%. The metering accuracy is further enhanced by very careful control of the viscosity of the two components of the mixture and of the temperature of the two components immediately before and during the metering. To achieve such controls the components are freed of entrained air by vacuum de-airing, and of tramp material by screening, and the delivery line and pumps are carefully jacketed and insulated.

The cams, not shown, are designed to impart a uniform motion to the pump plungers, and thus make the pumps 1 and 2 discharge uniform streams of each of the components. During the discharge stroke, pump 2 plunger moves 50% of its stroke while simultaneously the pump 1 plunger moves through 25%, thus the ratio of the volume of the component delivered through pump 1 to that delivered through pump 2 is 1:9.

After the two components have been accurately metered by the pumps, they are delivered simultaneously to the proportioning device 6 where they are proportionately blended upon delivery to the mixing chamber 12. The component delivered by pump 1 (a mixture of lead dioxide and an epoxy resin) enters the proportioning device 6 through chamber 5 and then passes into the tube 7. The other component (a mixture of a polymeric polysulfide and carbon black) enters from the delivery tube 4 to the annulus between the small tube 7 and the bore in the proportioning device. The dimensions of the proportioning device are such that the velocity of flow of the two components through the proportioning device is exactly equal. At 11, at the entrance end of the mixing chamber 12, the streams of the two components meet as a concentric stream of epoxy resin in polymeric polysulfide. The stream of the composition mixture must then pass down the mixing chamber 12. It is impelled down this chamber by the thrust of the stream of material behind it in the proportioning chamber. The countercurrent rotation of the stirrer 13, and especially the action of the spiral 16, causes very efficient stirring since the mixer shaft tends to fold the stream of composition back on itself. At the same time, the small notches 17 cut through the stream of the mixture and provide the shearing action necessary for the thorough mixing of such a viscous material. The small clearance between the mixer spiral and the mixer bore insures thorough mixing by elimination of any quiescent area between the spiral and the bore. During the mixing, the temperature is controlled accurately by the use of the jacketing means 21.

It is not necessary that the mixer be a notched spiral, as is shown although this is the preferred structure. Any distribution or shape of protuberances from the stirrer which are not directly circumferential or axial will effect proper mixing if they are shaped such that the rotation of the stirrer tends to oppose the flow of the material through the mixing chamber. For example, the mixer can have broken circular ridges whose planes are at an angle with the axis of the mixer, or it can have ridges and other protuberances placed at random, shaped as if they were part of incompleted spirals.

The mixed material, pushed by the pumping of further material through the proportioning chamber, is forced out the exit 19. The narrowing down of the mixing chamber at point 18 eliminates any dead space in the exit end of the mixing chamber and prevents mixed composition from becoming lodged and setting up there.

The rod 22 is used to block the tube 7 when the apparatus is shut down. It is dropped into place and the mixing chamber is then flushed out with a continued stream from pump 2, thus preventing the setting of mixed composition in the mixing chamber or exit line. When the apparatus is restarted, the rod 22 is withdrawn and the flow of both ingredients is started. The flow is then ready for use.

Variations in the details of the structure will be obvious to those skilled in the art. The size and shape of the exit tubing 19 will be governed by the type of flow required to be emitted, that is, either a fine, thin stream or a heavy thick stream. Also, it is possible to use this apparatus, either in a continuously repeating cyclic operation such as has been described, or in an operation requiring a continuous stream of material. To obtain a continuous stream, one uses several pumps in parallel in each line, pumping out of phase to one another. The spiral of wire 16 wound on the mixing rod 13 can equally well be a spiral ridge molded or shaped in the mixer rod. Welding a wire on the rod is just a convenient method of obtaining such a ridge.

The heating of the various parts of the apparatus can be done by any convenient means. While a jacket is shown on the mixing chamber 10, this, as well as any other part of the apparatus, can equally well be heated by electrical methods. Where it is not necessary to provide direct heating for some parts of the lines, it is usually preferable, at least to insulate them, if the material passing through them is hot.

For convenience in cleaning or repairing the internal parts of the proportionating structure, it is shown as detachable from the mixing chamber. It can be fastened thereto by any means known in the art, or the two can alternatively be made from a single piece of metal.

Variations in the operation of the invention can be obtained also by control of the temperature of the mixing operation. If the mixture be heated hotter, the pot life of the multi-component resin mixture will be decreased, and conversely by using a lower temperature, a longer pot life can be obtained. These factors can be adjusted to the individual resin to be used.

The apparatus of the present invention is usable, not only for the mixture of ingredients described above but also for any other mixture of viscous materials which when mixed and heated has a short pot life. Numerous other such mixtures occur in resin chemistry, and thus this apparatus is of wide application in that field. For example, a catalyzed mixture of a vinyl compound and a polymeric ester from a polyhydric alcohol and an unsaturated dibasic acid will be very viscous and have a short pot life even at room temperature. The metering out of small quantities of such a mixture can also be effected in our apparatus. If more than two ingredients are to be mixed, it is possible to provide for other inlets into the proportionating device. Such inlets could be arranged in any convenient manner. For example, if three ingredients are to be mixed into one composition, two of which can be safely mixed into a composition which is stable until the third one is added, the two safely mixed materials are brought together in the chamber 5 while the other composition is introduced through the annulus 8. In this case, the question of pot life does not arise until the three components had come together at point 11. If none of the components could be mixed safely with any of the others, a third concentric stream can be added by having two concentric pipes or tubes inside the bore. Similarly, even larger numbers of components can be handled.

The time of residence of the composition in the mixing chamber where after having been mixed, it is now exposed to the danger of setting, if not emitted and cast in place before the end of the pot life, can be controlled by adjusting either or both of two factors. One, is the rate of flow of the material into the mixing chamber, and second, is the size of the mixing chamber. By the adjustment of these factors, and of the temperature at which the apparatus is kept, the mixing device can be adjusted to accommodate any sort of pot life which is liable to be encountered.

By changing the size of the pumps delivering the material to the proportionating device, and by using different cams, the ratio of the ingredients of the composition can be varied within wide limits. By changing the size of the proportionating chamber and mixing chamber, as well as the size of the pumps, the apparatus of our invention can be constructed to deliver varying quantities of material as desired, ranging from the very small amounts described, to sizable quantities per minute, depending principally on the capacity of the pumps and the pot life of the composition since it is necessary that all the mixed composition be ejected before the end of its pot life.

We claim:

An apparatus for accurately proportionating, mixing, and metering compositions of short pot life comprising mixtures of several different resins whose individual component mixtures are stable until mixed which comprises, in combination, a proportionating structure comprising two vertical concentric tubes; flow passageways separately entering each of said tubes from the side; a reciprocating pump connected to each of said flow passageways, said pumps being accurately dimensioned and controlled to deliver predetermined quantities per unit time; a movable rod positioned at the top of the inner of said concentric tubes capable of moving along the central axis of said tube and being dimensioned so as to fill the said tube completely when moved into it in order to block said tube completely to the flow of one of said resin components; said flow passageways and concentric tubes being dimensioned in proportion to said predetermined quantities; a horizontal cylindrical mixing chamber into one end of which said concentric tubes open; a stirrer means filling most of said cylindrical mixing chamber and comprising a cylindrical rod journalled at the ends of said mixing chamber, said cylindrical rod having a periodically interrupted spiral ridge along its outer surface; said cylindrical rod being rotatable in a direction such that the motion of the said spiral ridge impels compositions injected through said concentric tubes into said mixing chamber back toward the exit from said concentric tubes and hence opposes the flow through the mixing chamber, the said flow being caused solely by said pumps; said mixing chamber being tapered at the end opposite the opening of said concentric tubes into a small horizontal passageway; said horizontal passageway having an exit passageway leading therefrom at an angle.

References Cited in the file of this patent

UNITED STATES PATENTS

| | | |
|---|---|---|
| 1,507,139 | Pike | Sept. 2, 1924 |
| 1,959,712 | Flowers | May 22, 1934 |
| 2,044,332 | Rowland | June 16, 1936 |
| 2,200,997 | Royle | May 14, 1940 |
| 2,514,841 | Chase | July 11, 1950 |
| 2,662,243 | Schnuck et al. | Dec. 15, 1953 |
| 2,768,405 | Mineah | Oct. 30, 1956 |
| 2,788,337 | Preiswerk et al. | Apr. 9, 1957 |

FOREIGN PATENTS

| | | |
|---|---|---|
| 3,162 | Switzerland | Feb. 11, 1891 |